US005490490A

United States Patent [19]

Weber et al.

[11] Patent Number: 5,490,490

[45] Date of Patent: Feb. 13, 1996

[54] ON-BOARD GAS COMPOSITION SENSOR FOR INTERNAL COMBUSTION ENGINE EXHAUST GASES

[75] Inventors: Willes H. Weber, Ann Arbor; Bennie D. Poindexter, Westland; Jeffrey T. Remillard, Ann Arbor, all of Mich.

[73] Assignee: Ford Motor Company, Dearborn, Mich.

[21] Appl. No.: 363,844

[22] Filed: Apr. 27, 1995

[51] Int. Cl.[6] .......................... F02D 41/14; G01N 30/02

[52] U.S. Cl. .......................... 123/697; 123/703; 73/23.32; 356/318

[58] Field of Search .......................... 123/425, 697, 123/703; 73/23.2, 23.31, 23.32; 60/276; 204/424, 426; 250/252.1, 304; 422/91; 356/306, 311, 313, 417, 317, 318

[56] References Cited

U.S. PATENT DOCUMENTS

| | | | |
|---|---|---|---|
| 3,906,226 | 9/1975 | Okabe et al. | 250/304 |
| 4,476,870 | 10/1984 | Peterson et al. | 128/634 |
| 4,810,655 | 3/1989 | Khalil et al. | 436/138 |
| 4,915,080 | 4/1990 | Nakaniwa et al. | 123/703 |
| 4,930,478 | 6/1990 | Plee et al. | 123/425 |
| 4,944,273 | 7/1990 | Baresel et al. | 123/703 |
| 4,957,705 | 9/1990 | Uchikawa | 123/703 |
| 5,039,491 | 8/1991 | Saaski et al. | 422/82.05 |
| 5,043,285 | 8/1991 | Surgi et al. | 436/136 |
| 5,067,463 | 11/1991 | Remboski et al. | 123/425 |
| 5,109,729 | 3/1992 | Hauenstein et al. | 477/109 |
| 5,128,102 | 7/1992 | Kaneko et al. | 422/56 |
| 5,155,046 | 10/1992 | Hui et al. | 436/136 |
| 5,173,432 | 12/1992 | Lefkowitz et al. | 436/138 |
| 5,205,988 | 4/1993 | Tanaka et al. | 422/91 |
| 5,242,835 | 9/1993 | Jensen | 436/136 |
| 5,333,487 | 8/1994 | Kimura et al. | 73/23.31 |

FOREIGN PATENT DOCUMENTS 4-95765 3/1992 Japan .

*Primary Examiner*—Willis R. Wolfe
*Attorney, Agent, or Firm*—Lorraine S. Melotik; Roger L. May

[57] ABSTRACT

An on-board gas composition sensor is disclosed for monitoring oxygen content levels in the exhaust gas of an internal combustion engine. The gas composition sensor includes a light source for generating excitation light, e.g. in the 350–525 nm wavelength range. A sensor body of porous high-temperature fluorescent inorganic oxide ceramic exposed to the exhaust gas emits an optical fluorescence signal responsive to oxygen content in the exhaust gas upon exposure to the excitation light at 400°–650° C. A florescence detector receives the optical fluorescence signal from the sensor means and generates an exhaust gas oxygen content output signal in response. Fiber-optic cable can be employed for transmitting excitation light to the sensor body from a remotely located light emitter. The same or a separate fiber-optic cable can transmit the optical fluorescent signal from the sensor body to the fluorescence detector also at a remote location.

20 Claims, 4 Drawing Sheets

ON-BOARD GAS COMPOSITION SENSOR FOR INTERNAL COMBUSTION ENGINE EXHAUST GASES

INTRODUCTION

The present invention is directed to an on-board gas composition sensor for monitoring oxygen content levels in the exhaust gas from an internal combustion engine. More particularly, the invention is directed to a gas composition sensor suitable for use with exposure to the harsh environment of a motor vehicle exhaust conduit.

BACKGROUND

Motor vehicle manufacturers use on-board gas sensors to monitor exhaust gases, for engine control purposes and/or for determining the performance of a catalytic converter treating engine exhaust gases as they are passed by the exhaust conduit from the engine to the atmosphere. Sensors of this type must be sufficiently robust to withstand the high temperatures and aggressive gases to which the sensor is exposed in the exhaust conduit, including elevated temperatures typically of about 500°–600° C., temperature cycling, vibration, intermittent moisture, etc. Sensors of this type used to date are disadvantaged by the need for electrical leads and shielding near the active part of the sensor. Typically, such known sensors produce an electrical signal which varies in relation to the oxygen content level of the exhaust gas. The sensor output signal may be used as an input to an electronic engine control means, such as for an electronic engine control module controlling the air/fuel mixture which is fed at any given point in time to a combustion chamber of the engine. Maintaining the integrity of the electrical connections to the sensor presents a challenge in the field of motor vehicle engine control. In addition, a problem is presented in maintaining the correct functioning of the active sensor material exposed to the harsh environment of the exhaust conduit.

It is an object of the present invention to provide an on-board gas composition sensor suitable for monitoring oxygen content in the exhaust gas of an internal combustion engine. In particular, it is an object of the invention to provide a robust gas composition sensor having good response time, good durability in the exhaust gas environment, and avoiding some of the disadvantages of the known exhaust gas oxygen sensors. These and additional objects of the invention will be understood from the following disclosure and detailed description of certain preferred embodiments.

SUMMARY OF THE INVENTION

In accordance with a first aspect, an on-board gas composition sensor is provided for monitoring oxygen content in the exhaust gas from an internal combustion engine of a motor vehicle. The gas composition sensor comprises a light source for generating excitation light, in a preselected wavelength or range of wavelengths, preferably in the 350–525 nm wavelength range. A sensor body of porous high-temperature fluorescent inorganic oxide ceramic is provided, which upon exposure to the motor vehicle exhaust gas, typically at 400°–650° C., responds to the excitation light by emitting a longer wavelength optical fluorescence signal which is responsive to oxygen content in the exhaust gas. A fluorescence detector is provided for receiving the optical fluorescence signal from the sensor. The fluorescence detector generates an exhaust gas oxygen content output signal in response to the optical fluorescence signal. It will be understood by those skilled in the art, that is, by those who are knowledgeable generally in this area of technology, that the exhaust gas oxygen sensor disclosed here represents a significant technological advance. Most notably, the sensor relies upon an optical fluorescence signal, rather than an electrical signal as in various known sensor devices. By using a porous high-temperature fluorescent inorganic oxide ceramic to generate an optical fluorescence signal, a robust sensor apparatus is provided, having a fast response time and suitable for use in the harsh environment of a motor vehicle exhaust conduit. Since the on-board gas composition sensor disclosed here relies upon an optical signal, the need for electrical leads and shielding near the active material, as in prior known exhaust gas oxygen sensors, is avoided, with consequent advantages in robustness of the sensor, reliability and durability.

The inorganic oxide ceramic used as the active material of the exhaust gas oxygen sensors disclosed here, is porous. This should be understood to mean that the active material of the sensor is a high-surface-area, crystalline or amorphous ceramic. Those skilled in the art will understand that the porosity of the ceramic creates internal surface area within the ceramic material, readily reachable by the exhaust gases. The active material is "high-temperature" in the sense that it has good high-temperature stability. More particularly, the ceramic is a high-temperature ceramic in that it is suitable for use preferably in a 400°–650° C. environment typical of a motor vehicle exhaust conduit, and has good functionality at that temperature. The ceramic material is "fluorescent," meaning that it generates an optical fluorescence signal which varies measurably with oxygen content in the exhaust gases when the ceramic material is exposed to excitation light preferably in the 350–525 nm wavelength range from the aforesaid light source. The optical fluorescence signal may either increase or decrease with oxygen content. In this regard, optical oxygen sensors have previously been proposed that employ the fluorescence quenching property of oxygen, such as in U.S. Pat. No. 4,476,870 to Peterson et al, U.S. Pat. No. 5,043,285 to Surgi, U.S. Pat. No. 5,190,729 to Hauenstein et al, and U.S. Pat. No. 5,155,046 to Hui et al. Such previously proposed oxygen sensors are unsuitable, however, for use as an exhaust gas oxygen sensor in a motor vehicle, since none provide a high-temperature active material. Rather, such previously proposed oxygen sensors employ organic or organometallic dyes, that would decompose at the elevated temperatures of the motor vehicle exhaust environment. In contrast, the exhaust gas oxygen sensors disclosed here employ a porous (high-surface-area) high-temperature, inorganic oxide ceramic suitable for use in the harsh exhaust gas environment, having rapid, reversible fluorescence changes corresponding to oxygen content level changes in the exhaust gas when exposed to the aforesaid excitation light.

In accordance with another aspect, transmittance or conveyor means are provided for carrying the excitation light to the sensor body of porous high-temperature fluorescent inorganic oxide ceramic from the light source at a location remote from the sensor body. Preferably, fiber-optic cable is provided for carrying the excitation light from the light source to the sensor body, and fiber-optic cable also carries the optical fluorescence signal from the sensor body to the fluorescence detector. A single fiber-optic cable can transmit both the excitation light to the sensor body, which preferably is formed as a bead of the porous high-temperature fluorescent inorganic oxide ceramic fused at the end of the fiber-optic cable, and also the optical fluorescence signal from the sensor body to the fluorescence detector. In accordance with this aspect, certain componentry of the exhaust gas oxygen sensor can be mounted at a location remote from the harsh motor vehicle exhaust environment, with fast, robust and reliable interconnection to the sensor body mounted for exposure to the exhaust gas. .

Additional features and advantages of various preferred embodiments of the invention will be apparent from the following detailed discussion.

BRIEF DESCRIPTION OF THE DRAWINGS

Certain preferred embodiments will now be discussed in detail with reference to the appended drawings wherein.

DETAILED DESCRIPTION OF CERTAIN PREFERRED EMBODIMENTS

Figure 1:
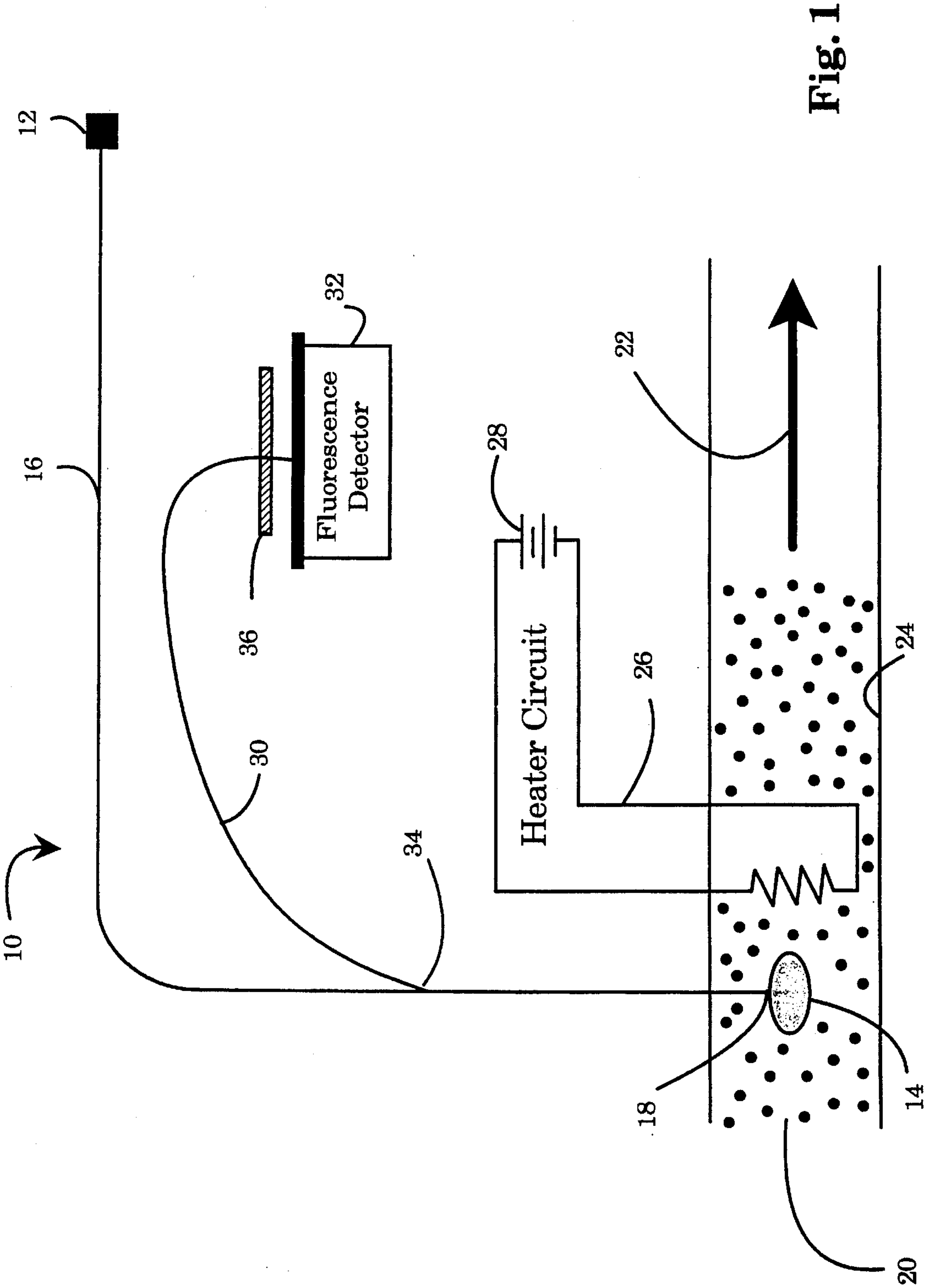
FIG. 1 schematically illustrates a first preferred embodiment of an on-board gas composition sensor for monitoring oxygen content levels in the exhaust gas of an internal combustion engine.

It will be readily understood by those who are skilled in the art that there are numerous alternative designs for sensor apparatus using the optical fluorescence signal from porous high-temperature fluorescent inorganic oxide ceramic to monitor the gas composition in situ in the hot, corrosive motor vehicle exhaust gas environment, in accordance with the present disclosure. The on-board gas composition sensor 10 schematically illustrated in FIG. 1, is seen to have a light source 12 for generating excitation light in the 350–525 nm wavelength range. Suitable light sources are commercially available and will be readily apparent to those skilled in the art in view of the present disclosure. Exemplary suitable light sources include laser diodes, light-emitting diodes, and the like. Auxiliary focussing and filtering means are well known to those skilled in the art and their use with such light source will be readily apparent in view of the present disclosure.

The light from light source 12 is transmitted to a sensor means comprising a sensor body 14 of porous high-temperature fluorescent inorganic oxide ceramic via fiber-optic cable 16. Suitable fiber-optic cable is readily commercially available, and will be apparent to those skilled in the art in view of the present disclosure. Fiber-optic cable 16 should be adapted for high efficiency transmission of excitation light in the 350–525 nm wavelength range and sufficiently robust for exposure at its distal end 18 to the harsh motor vehicle exhaust gas environment. Preferably, the sensor body 14 consists essentially of a bead of the porous high-temperature fluorescent inorganic oxide ceramic fused to distal end 18 of fiber-optic cable 16.

Ceramic bead 14 is seen to be exposed to exhaust gas 20, flowing in the direction of arrow 22 as it is passed to the atmosphere by exhaust gas conduit 24 of an internal combustion engine. The ceramic bead 14 will emit an optical fluorescence signal responsive to, preferably varying proportionately with, oxygen content in the exhaust gas 20, upon exposure of the ceramic bead at a temperature typically in the range of 400°–650° C. to the excitation light carried to it by fiber-optic cable 16 from light source 12.

In certain applications, it will be desirable to provide accelerated heating of the sensor body 14 to its operating temperature of 400°–650° C. more rapidly than would occur naturally following a cold start of the motor vehicle. In such applications, it is preferred to provide a heater for the sensor body 14, most preferably an electrical resistance heater. As seen in FIG. 1, electrical resistance heater 26 is provided proximate the ceramic bead 14. Heater 26 is connected to an electrical power source 28 of the vehicle, and can be actuated upon engine start-up by suitable automatic actuation means in accordance with devices and techniques well known to those skilled in the art.

The optical fluorescence signal generated by the sensor body 14 is carried by optical cable 30 to fluorescence detector 32. In the preferred embodiment in accordance with the illustration of FIG. 1, a 514.5 nm laser is used as a light source for generating excitation light to be transmitted via optical cable 16, and optical filter 36 excludes fluorescence at wavelengths shorter than about 530 or 540 nm. Thus, fluorescence detector 32 monitors the optical fluorescence signal at wavelengths longer than about 530–540 nm, and is not substantially affected by leakage of excitation light from fiber-optic cable 16 to fiber-optic cable 30. Preferably, the optical fluorescence signal is detected over a preselected portion or the entire wavelength range between such upper wavelength of the excitation light and the upper limit of detection for commercially available silicon detectors, i.e., approximately 1,000 nm.

Figure 2:
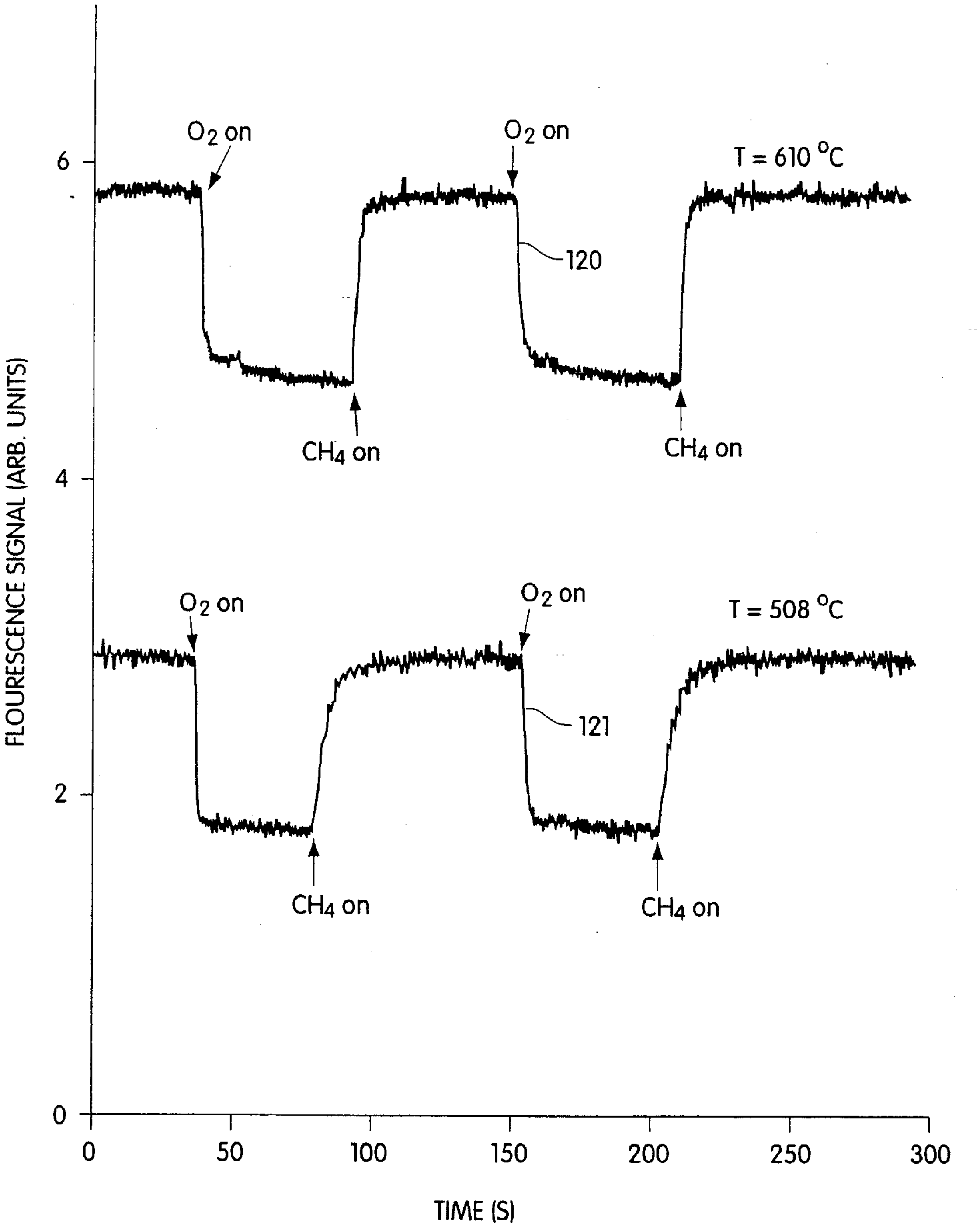
FIG. 2 is a graphical representation of the optical fluorescence signal obtained from the gas composition sensor of FIG. 1 at two exemplary operating temperatures.

Numerous suitable porous high-temperature fluorescent inorganic oxide ceramics are available for use as the active material of the gas composition sensor disclosed here, and will be readily apparent to those skilled in the art in view of the present disclosure. Suitable ceramics include ion-exchanged zeolites, such as copper-bearing zeolites, e.g. commercially well known Cu-ZSM-5 zeolite, and other zeolites bearing typically about one percent by weight copper or other suitable metal ions. The measurable correspondence of the optical fluorescence signal produced by Cu-ZSM-5 zeolite at two different operating temperatures, 610° C. and 508° C., to the oxygen content of a gas stream simulating motor vehicle exhaust gas, is shown in FIG. 2. Specifically, FIG. 2 shows the strength of the optical fluorescence signal for gas composition sensor 10 of FIG. 1, measured in arbitrary units as a function of time for a sensor body of Cu-ZSM-5 zeolite in a stream of argon gas flowing at 250 sccm with alternately five percent $O_2$ and five percent $CH_4$, using a 514.5 nm laser source for excitation light and monitoring fluorescence at wave lengths longer than about 540 nm. An optical filter associated with the fluorescence detector excluded shorter wavelengths. The two traces shown in FIG. 2, trace 120 for response data at 610° C., and trace 121 for response data at 508° C., are marked to indicate the points at which five percent oxygen flow was turned on (and the flow of $CH_4$ turned off) and the points at which five percent $CH_4$ gas flow was turned on (and correspondingly, the flow of $O_2$ turned off). As can be seen, a fast and large change in the optical fluorescence signal occurs each time the gas flow is switched between five percent $O_2$ and five percent $CH_4$. The response time is somewhat faster at the higher temperature; the magnitude of the response is substantially equal. Significantly, the optical fluorescence signal changes are seen to be completely reversible and sufficiently rapid for use to generate an output signal useful as one of perhaps a number of input signals for an electronic engine control module controlling the air/fuel ratio fed to the engine to reduce emissions of unwanted combustion gases. Such sensor also is suitable for use in monitoring the performance of a catalytic converter treating exhaust gases from the engine. Such latter application may, for example, employ multiple such gas sensors positioned in the exhaust conduit both upstream and downstream of the catalytic converter.

Additional suitable porous high-temperature fluorescent inorganic oxide ceramics include, for example, cerium oxide and gamma alumina, preferably $\gamma$-$Al_2O_3$. Additional suitable materials will be apparent to those skilled in the art in view of the present disclosure. Furthermore, additional suitable materials may be developed for particular applications based on the guidance provided by this disclosure.

The fluorescence detector means may comprise a silicon detector, as mentioned above, in view of their commercial availability. Preferably it comprises a photospectrometer having an array detector for receiving the optical fluorescence signal and generating a response signal. The response signal is fed to integration means of the fluorescence detector for spectrally integrating the response signal over a preselected range, preferably being optimized to match the emission spectrum of the fluorescent inorganic oxide ceramic over a preselected time interval, e.g. 0.5 to 4.0 seconds, preferably about 2 seconds. A suitable wavelength range typically is within about 530 to 1000 nm, e.g. 536 or 540 to 560 nm.

Figure 3:
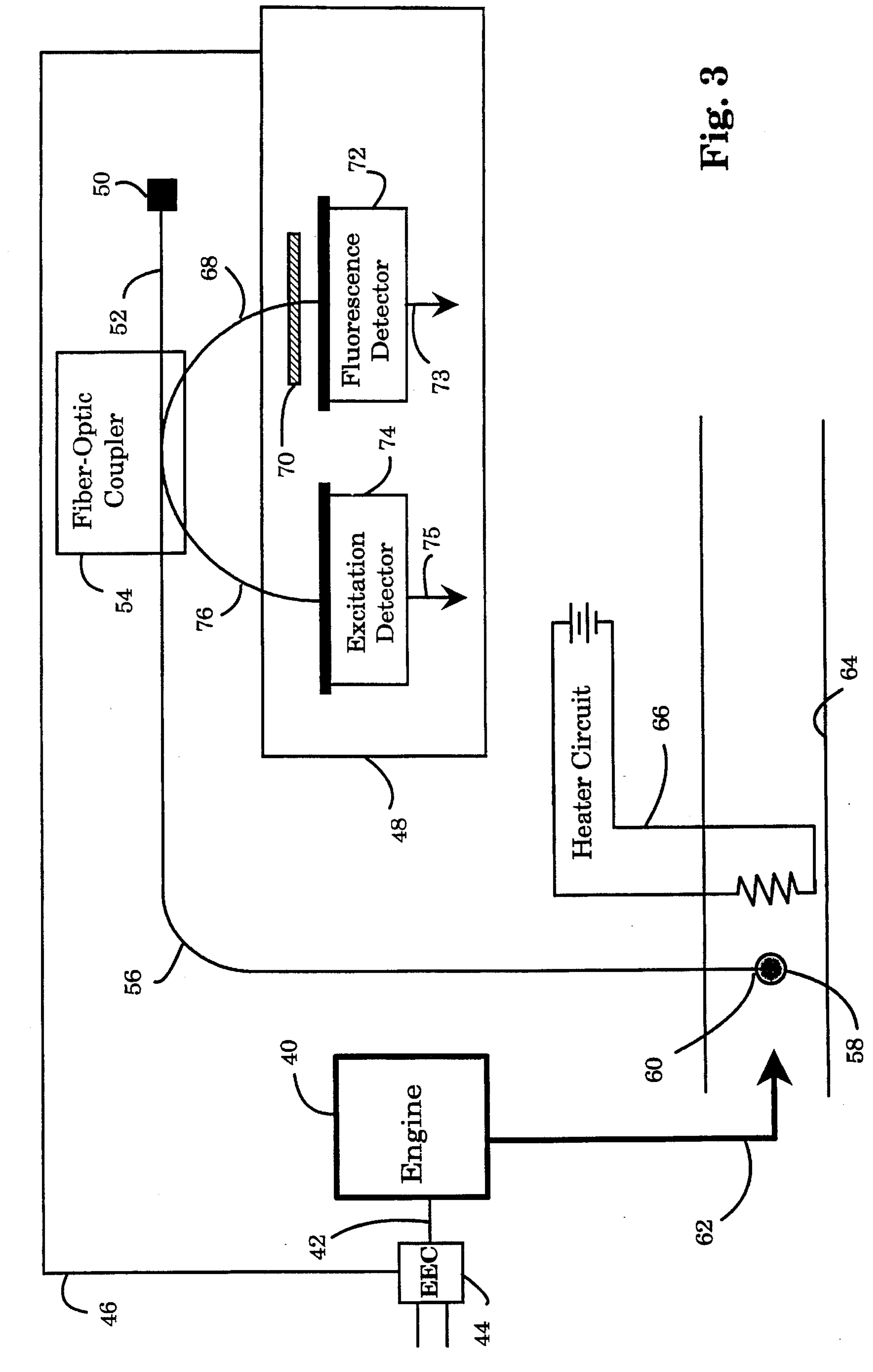
FIG. 3 is a schematic illustration of a second preferred embodiment of the on-board exhaust gas oxygen sensor.

Another preferred embodiment is illustrated in FIG. 3, wherein the air/fuel ratio fed to an internal combustion engine 40 is controlled by an air/fuel signal 42 generated by an electronic engine control ("EEC") module 44, based on various input signals, including sensor output signal 46 from detector apparatus 48. Excitation light is generated by light source 50, for example, a laser diode or light-emitting diode, as discussed above. The excitation light is transmitted by a first portion 52 of fiber-optic cable extending between the light source 50 and a fiber-optic coupler 54. A second portion 56 of fiber-optic cable extends between the fiber-optic coupler 54 and sensor body 58. Sensor body 58 consists essentially of a porous high-temperature fluorescent inorganic oxide ceramic as disclosed above, formed as a bead fused to the end 60 of fiber-optic cable portion 56. Thus, the excitation light is carried to the active material of the sensor, which is mounted for exposure to engine exhaust gas 62 within exhaust conduit 64. As in the embodiment of FIG. 1, an electrical resistance heater 66 is provided for rapidly heating sensor body 58 to its operating temperature between 400°–650° C. A third portion 68 of fiber-optic cable extends between the fiber-optic coupler 54 and the fluorescence detector 72 of the detector apparatus 48. In this way, the optical fluorescence signal generated by sensor body 58 and carried by portion 56 of the fiber-optic cable, is transmitted to the fluorescence detector 72. Detector apparatus 48 further includes an optical filter 70 for filtering out excitation light carried by the fiber-optic cable before it reaches fluorescence detector 72, which preferably is a photospectrometer having an array detector for receiving the optical fluorescence signal and generating an exhaust gas oxygen content output signal 73 based thereon. Fluorescence detector 72 preferably further has an integrator in accordance with known techniques and devices for spectrally integrating the response signal over a preselected range, over a preselected time period, as disclosed above. Thus, change in the intensity of the fluorescence is monitored as a function of time.

In order to compensate for drift in the intensity of the excitation light from light source 50, detector apparatus 48 further comprises excitation detector 74 at the termination of fourth portion 76 of fiber-optic cable extending from fiber-optic coupler 54. The excitation detector 74 detects the level of excitation light and generates a compensation signal 75 corresponding to the intensity of the excitation light. The exhaust gas oxygen content output signal 73 is adjusted based on the compensation signal. That is, detector apparatus 48 employs compensation signal 75 from excitation detector 74 for adjusting the exhaust gas oxygen content output signal 73 from fluorescence detector 72 to generate sensor output signal 46 to the electronic engine control 44.

It will be recognized that fiber-optic portion 56 carries both the excitation light to the ceramic bead 58 and the optical fluorescence signal from the ceramic bead. In the alternative, separate fiber-optic cable can be used. The two fiber-optic cables could, in that case, be joined at the sensor body. That is, the end of each can be fused into the ceramic bead.

Figure 4:
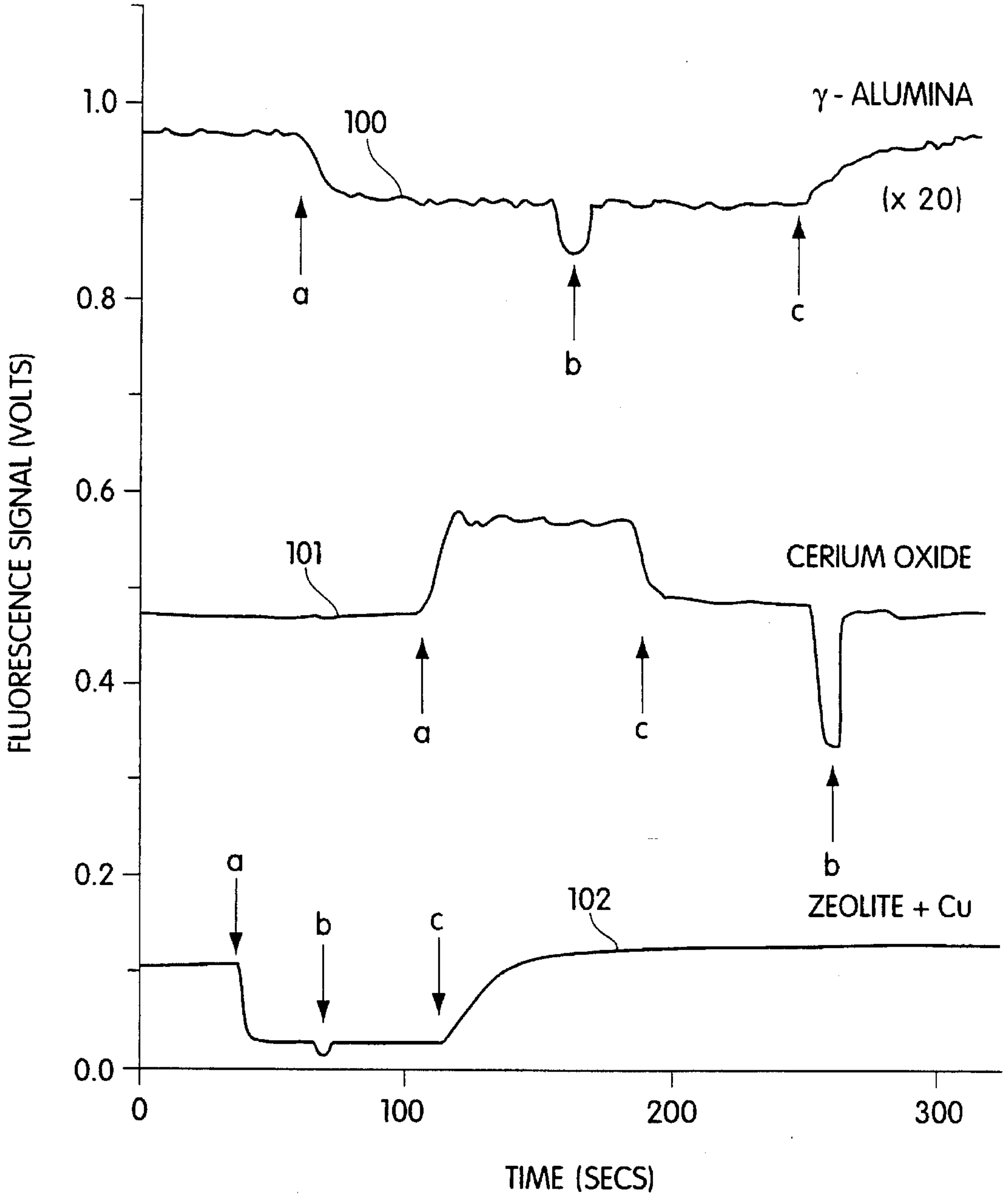
FIG. 4 is a graph showing the correspondence of the exhaust gas oxygen content output signal of a fluorescence detector, based on the correspondence of the optical fluorescence signal of certain preferred sensor materials, to oxygen content level in a gas stream under test conditions simulating the harsh motor vehicle exhaust environment.

The graph shown in FIG. 4 illustrates the correspondence of the optical fluorescence signal from a sensor body of porous high-temperature fluorescent inorganic oxide ceramic, as disclosed above, to the presence and absence of oxygen in a gas stream. Test results for three different materials are shown: trace 100 shows test data for gamma-alumina; trace 101 shows test data for cerium oxide; and trace 102 shows test data for the 1% by weight copper-bearing zeolite Cu-ZSM-5. In each case, a sensor body consisting essentially of the specified inorganic oxide ceramic, was placed in a test cell through which controlled amounts of oxygen and reductant gas could be passed. The ceramic was illuminated through an optical window with 514.5 nm light from an argon ion laser. To eliminate the excitation light at 514.5 nm, the optical fluorescence signal generated by the sensor body was collected and imaged onto the slits of a spectrometer equipped with an array detector. The output signal was generated by spectrally integrating the array detector output over the range of 536–560 nm during a two second interval. Thus, the change in intensity of the optical fluorescence signal between 536 and 560 nm was monitored as a function of time. The data shown in FIG. 4 have been offset by 0.3 volt for clarity. The cerium oxide and zeolite sensor bodies each were held at 450° C.; the gamma-alumina was held at 400° C. Prior to the point marked "a" in each trace, the sensor body under test was exposed to a gas flow comprised of five percent $CH_4$ in argon. At point "a" the gas mix flowing through the test cell was changed to five percent oxygen in argon gas, except in the case of the zeolite sensor body, for which a mixture of 0.5 percent oxygen in argon was used. It can be seen that in the case of the zeolite sensor body and the gamma-alumina sensor body, the optical fluorescence signal was quenched upon exposure of the sensor body to oxygen in the gas stream. In contrast, the cerium oxide sensor body showed an increase in the fluorescence intensity when exposed to oxygen in the gas flow. At the point "c" the gas flow was changed back to the five percent $CH_4$ in argon gas. In the case of the gamma-alumina sensor body and the zeolite sensor body the fluorescence intensity increased to approximately the same value observed prior to the point at which oxygen flow commenced. For the cerium oxide sensor body, the switch back to methane/argon gas mixture reduced the intensity of the fluorescence to approximately the value observed prior to the addition of oxygen. At point "b" the excitation light was blocked to mark the zero level of fluorescence on each trace. The data shown in FIG. 4 illustrate that the presence of oxygen in a gas flow stream at elevated temperature can be accurately detected by observing changes in the fluorescence of sensor bodies formed of porous high-temperature fluorescent inorganic oxide ceramics. In addition, the fluorescence change is shown to be both rapid and reversible.

In view of the foregoing disclosure, it will be apparent to those skilled in the art that various additions, modifications, etc. can be made without departing from the true scope and spirit of the invention. All such additions and modifications are intended to be covered by the following claims.

We claim:

1. An on-board gas composition sensor for an internal combustion engine, for monitoring oxygen content in exhaust gas from the internal combustion engine, the gas composition sensor comprising, in combination:

light source means for generating excitation light in a preselected wavelength range;

sensor means comprising a sensor body of porous high-temperature fluorescent inorganic oxide ceramic, for emitting an optical fluorescence signal responsive to oxygen content in the exhaust gas upon exposure of the sensor body to the excitation light at 400°–650° C.; and fluorescence detector means for receiving a preselected wavelength range of the optical fluorescence signal which is above the excitation light wavelength range, and for generating an exhaust gas oxygen content output signal in response to the optical fluorescence signal.

2. The on-board gas composition sensor for an internal combustion engine in accordance with claim 1, further comprising heater means for heating the sensor body to a temperature between 400° and 650° C.

3. The on-board gas composition sensor for an internal combustion engine in accordance with claim 2 wherein the heater means comprises an electrical resistance heater proximate to the sensor body.

4. The on-board gas composition sensor for an internal combustion engine in accordance with claim 1 further comprising light conveyer means comprising fiber-optic cable for carrying the excitation light from the light source means to the sensor body.

5. The on-board gas composition sensor for an internal combustion engine in accordance with claim 4 wherein the sensor body consists essentially of a bead of said porous high-temperature fluorescent inorganic oxide ceramic fused to an end of the fiber-optic cable.

6. The on-board gas composition sensor for an internal combustion engine in accordance with claim 1 wherein fiber-optic cable of the light conveyor means also carries the optical fluorescence signal from the sensor body to the fluorescence detector means.

7. The on-board gas composition sensor for an internal combustion engine in accordance with claim 1 wherein the detector means comprises an optical filter for filtering out excitation light carried by the fiber-optic cable from the sensor body to the fluorescence detector means.

8. The on-board gas composition sensor for an internal combustion engine in accordance with claim 1 wherein the light source means generates excitation light in the 350 to 525 nm wavelength range.

9. The on-board gas composition sensor for an internal combustion engine in accordance with claim 1 wherein the light source means is selected from the group consisting of laser diodes and light emitting diodes.

10. The on-board gas composition sensor for an internal combustion engine in accordance with claim 1 wherein the porous high-temperature fluorescent inorganic oxide ceramic consists essentially of $\gamma$-$Al_2O_3$.

11. The on-board gas composition sensor for an internal combustion engine in accordance with claim 1 wherein the porous high-temperature fluorescent inorganic oxide ceramic consists essentially of a copper-bearing zeolite.

12. The on-board gas composition sensor for an internal combustion engine in accordance with claim 11 wherein the porous high-temperature fluorescent Inorganic oxide ceramic consists essentially of Cu-ZSM-5 zeolite.

13. The on-board gas composition sensor for an internal combustion engine in accordance with claim 1 wherein the porous high-temperature fluorescent inorganic oxide ceramic consists essentially of cerium oxide.

14. The on-board gas composition sensor for an internal combustion engine in accordance with claim 1 wherein the fluorescence detector means comprises a photospectrometer having an array detector for receiving the optical fluorescence signal and generating a response signal, and integration means for receiving and spectrally integrating the response signal over a wavelength range from the upper wavelength of the excitation light to 1000 nm of 536 to 560 nm over a preselected time interval.

15. The on-board gas composition sensor for an internal combustion engine in accordance with claim 1 further comprising excitation detector means for detecting the excitation light and generating a compensation signal corresponding to the intensity of the excitation light.

16. The on-board gas composition sensor for an internal combustion engine in accordance with claim 1 further comprising light conveyor means comprising a fiber-optic cable for carrying both the excitation light from the light source means and the optical fluorescence signal from the sensor body, the fiber-optic cable comprising:

a first portion extending between the light source means and a fiber-optic coupler;

a second portion extending between the fiber-optic coupler and the sensor body;

a third portion extending between the fiber-optic coupler and the fluorescence detector means, having an optical filter for filtering out excitation light carried by the fiber-optic cable; and a fourth portion extending between the fiber-optic coupler and the excitation detector.

17. An internal combustion engine for a motor vehicle, comprising, in combination:

a combustion chamber for burning an air/fuel mixture;

an exhaust conduit for passing exhaust gases form the combustion chamber to atmosphere;

an air/fuel mixture control means responsive to input signals for controlling the ratio of air and fuel in the air/fuel mixture; and an on-board gas composition sensor for monitoring oxygen content levels in the exhaust gases in the exhaust conduit for generating a sensor output signal as one of said input signals to the air/fuel mixture control means, the gas composition sensor comprising;

sensor means comprising a sensor body of porous high-temperature fluorescent inorganic oxide ceramic exposed to the exhaust gases in the exhaust conduit, for emitting an optical fluorescence signal responsive to oxygen content level in the exhaust gases upon exposure of the sensor body to excitation light in a 350 to 525 nm wavelength range at 400°–650° C.

light source means remote from the sensor body, for generating the excitation light, comprising a light emitter selected from a laser diode and a light emitting diode;

an electrical resistance heater proximate the sensor body for heating the sensor body to a temperature between 400°–650° C.;

fluorescence detector means remote from the sensor body, comprising a photospectrometer having an array detector for receiving the optical fluorescence signal from the sensor means and generating a response signal, and integration means for receiving and spectrally integrating the response signal over a range of 540 to 1000 nm over a preselected time interval of 0.5 to 4.0 seconds and generating an exhaust gas oxygen content output signal in response thereto;

excitation detector means for detecting the excitation light and generating a compensation signal corresponding to the intensity of the excitation light for adjusting the exhaust gas oxygen content output signal in response thereto for generating said sensor output signal of the gas composition sensor; and light conveyor means comprising a fiber-optic cable for carrying both the excitation light from the light source means and the optical fluorescence signal from the sensor body, the fiber-optic cable comprising:

a first portion extending between the light source means and a fiber-optic coupler;

a second portion extending between the fiber-optic coupler and the sensor body, the sensor body being fused to the fiber-optic cable;

a third portion extending between the fiber-optic coupler and the fluorescence detector means, having an optical filter for filtering out the excitation light carried by the fiber-optic cable; and a fourth portion extending between the fiber-optic coupler and the excitation detector.

18. The internal combustion engine of claim 17 wherein the porous high-temperature fluorescent inorganic oxide ceramic consists essentially of cerium oxide.

19. The internal combustion engine of claim 17 wherein the optical fluorescence signal of the porous high-temperature fluorescent inorganic oxide ceramic decreases with increased oxygen content level in the exhaust gases.

20. The internal combustion engine of claim 19 wherein the porous high-temperature fluorescent inorganic oxide ceramic is selected from the group consisting of gamma alumina and copper-bearing zeolite.

* * * * *